United States Patent [19]

Goebel

[11] 4,055,558
[45] Oct. 25, 1977

[54] TETRAKISAZO DYESTUFFS

[75] Inventor: Hermann Goebel, Leverkusen, Germany

[73] Assignee: Bayer Aktiengesellschaft, Leverkusen, Germany

[21] Appl. No.: 280,230

[22] Filed: Aug. 14, 1972

[30] Foreign Application Priority Data

Aug. 14, 1971 Germany ............................... 2140866

[51] Int. Cl.$^2$ ............................................. C09B 35/36
[52] U.S. Cl. .................................... 260/166; 260/178
[58] Field of Search ................................ 260/166, 168

[56] References Cited

U.S. PATENT DOCUMENTS

| | | | |
|---|---|---|---|
| 1,078,926 | 11/1913 | Kahn et al. ........................... | 260/166 |
| 2,096,896 | 10/1937 | Hauck et al. ......................... | 260/166 |

FOREIGN PATENT DOCUMENTS

| | | | |
|---|---|---|---|
| 966,768 | 10/1950 | France .................................. | 260/166 |
| 1,105,350 | 3/1968 | United Kingdom ................. | 260/166 |
| 1,019,467 | 2/1966 | United Kingdom ................. | 260/166 |

OTHER PUBLICATIONS

*Colour Index*, 2 Ed. (1957), vol. 3, p. 3306, C.I. 35445.
*Colour Index*, 2 Ed. (1957) vol. 3, p. 3306, C. I. 35435 & C.I. 35450.

Primary Examiner—Charles F. Warren

Attorney, Agent, or Firm—Plumley and Tyner

[57] ABSTRACT

The subject matter of the present invention relates to tetrakisazo dyestuffs which in the acid form correspond to the formula

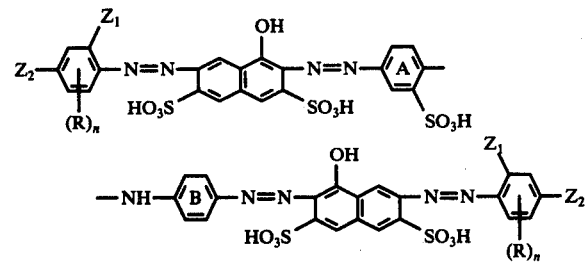

wherein
$Z_1$, $Z_2$ = an optionally substituted amino group
R = H or a non-ionogenic substituent, in particular halogen or alkyl,
n = an integer of 1 to 3 the rings A and B possible having further substituents, for example, alkoxy groups, such as methoxy groups, and the substituents R as well as $Z_1$ and $Z_2$ being the same or different. The new dyestuffs are suitable for dyeing and printing of natural fiber materials and distinguish themselves by good fastness properties.

2 Claims, No Drawings

TETRAKISAZO DYESTUFFS

The subject matter of the present invention relates to tetrakisazo dyestuffs which in the acid form correspond to the formula

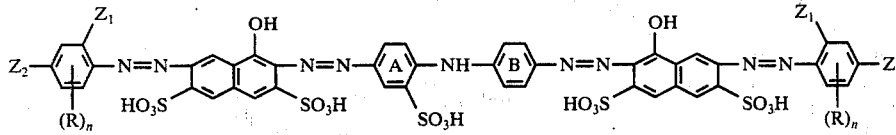

wherein $Z_1$, $Z_2$ = an optionally substituted amino group
R = H or a non-ionogenic substituent, in particular halogen or alkyl,
n = an integer of 1 to 3, the rings A and B possibly having further substituents, for example, alkoxy groups, such as methoxy groups, and the substituents R as well as $Z_1$ and $Z_2$ being the same or different.

Preferred substituents R are optionally substituted alkyl groups, in particular those with 1 - 4 C atoms and halogen, in particular chlorine as well as $NO_2$. The preferred radicals $Z_1$ and $Z_2$ are amino groups as well as monoalkylamino groups with an alkyl group which may be substituted, for example, by hydroxyl, sulphonic acid or carboxylic acid groups, said preferred radicals being in particular those groups with 1 to 4 C atoms in the alkyl radical, in addition acylamino groups, in particular acetylamino groups or aminocarbonylamino groups.

Preferred dyestuffs are accordingly those which in the acid form correspond to the formula

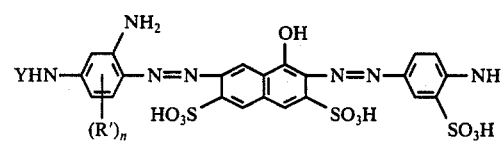

wherein
R' = H, $C_1$ - $C_4$ alkyl, Cl, $NO_2$,
n = an integer from 1 to 2
as well as those which in the form of the free acid correspond to the formula

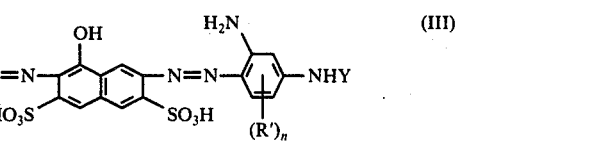

wherein
R' = H, $C_1$ - $C_4$ alkyl, Cl, $NO_2$,
n = an integer from 1 to 2
Y = an optionally substituted $C_1$ - $C_4$ alkyl, in particular by hydroxy, $SO_3H$ or COOH; aminocarbonyl.

The new dyestuffs of the formula (I) are obtained by coupling a tetrazotised amine of the formula

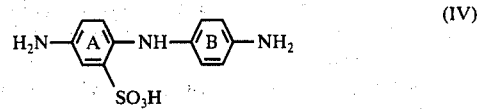

with 2 mol of 2-amino-8-hydroxynaphthalene-3,6-disulphonic acid to produce diaminodisazo dyestuffs of the formula

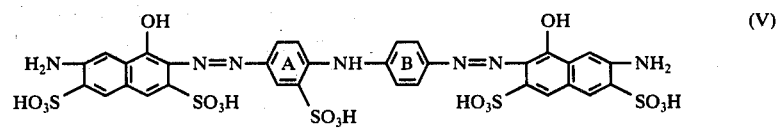

subsequently by tetrazotising and coupling onto 2 mol of a coupling component of the formula

wherein
$Z_1$, $Z_2$ = an optionally substituted amino group,
R = H or a non-ionogenic substituent,
n = an integer of 1 - 3.

Suitable coupling components (VI) are, for example, 1,3-diaminobenzene, 1-amino-3-alkylaminobenzenes, such as, 1-amino-3-methylaminobenzene, 1-amino-3-β-hydroxyethylaminobenzene, 1-amino-3-carboxymethylaminobenzene, 1-amino-3-sulphomethylaminobenzene, 1,3-diamino-4-nitrobenzene, 1-amino-3-aminocarbonyl-aminobenzene, 1-amino-3-actylaminobenzene.

The new dyestuffs are suitable for dyeing and printing natural fibre materials, in particular leather. Black dyeings with good fastness properties are obtained on these materials.

EXAMPLE 28 g of 4,4'-diamino-diphenylamine-2'-sulphonic acid are tetrazotised in known manner and coupled in an alkaline medium onto 64 g of 2-amino-8-hydroxynaphthalene-3,6-disulphonic acid. The resulting diaminodisazo dyestuff is further tetrazotised and coupled onto 22 g of 1,3-diaminobenzene. The dyestuff precipitated by the addition of sodium chloride and then isolated is easily soluble in water and dyes leather black.

If equivalent amounts of 1-methyl-2,4-diaminobenzene, 1-amino-3-methylaminobenzene, 1-amino-3-β-hydroxyethylaminobenzene, 1-amino-3-carboxymethylaminobenzene, 1,3-diamino-4-nitrobenzene or 1-amino-3-acetylaminobenzene are employed as end components, then black dyestuffs are obtained which are excellently suitable for dyeing leather.

I claim:

1. Tetrakisazo dyestuff which in the acid form corresponds to the formula

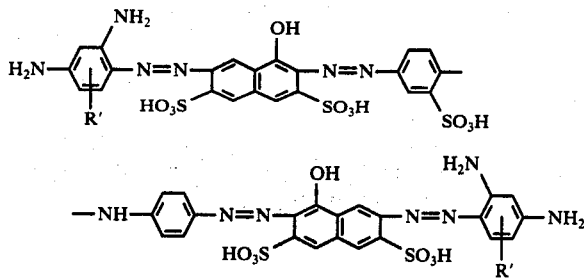

wherein R' = H, CH$_3$, or NO$_2$.

2. Dyestuff of the formula

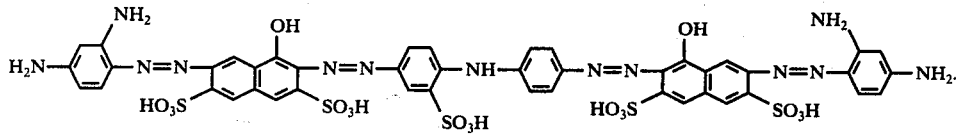

* * * * *